(12) United States Patent
Ferris et al.

(10) Patent No.: US 6,439,043 B1
(45) Date of Patent: Aug. 27, 2002

(54) STATIC TIRE TEST FIXTURE AND RELATED METHOD

(75) Inventors: John B Ferris, Pinckney; Mark A Froelich, Onsted, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/650,892

(22) Filed: Aug. 30, 2000

(51) Int. Cl.$^7$ ................................................ E01C 23/00
(52) U.S. Cl. ...................................................... 73/146
(58) Field of Search ....................... 73/146, 148, 11.04, 73/862.454; 151/1.17

(56) References Cited

U.S. PATENT DOCUMENTS

| | | | |
|---|---|---|---|
| 3,581,563 A | 6/1971 | Christie et al. ............... | 73/146 |
| 3,589,182 A | 6/1971 | Burgett ........................ | 73/146 |
| 3,861,208 A * | 1/1975 | Lippmann et al. ............ | 73/146 |
| 4,169,373 A * | 10/1979 | Clark et al. .................... | 73/146 |
| 4,986,118 A | 1/1991 | Pottinger ..................... | 73/146 |
| 5,165,273 A | 11/1992 | Church ........................ | 73/146 |
| 5,515,726 A | 5/1996 | Welsh ......................... | 73/571 |
| 5,773,717 A | 6/1998 | Reinhardt et al. ............ | 73/146 |
| 6,199,270 B1 * | 3/2001 | Menard et al. ............... | 29/711 |
| 6,269,688 B1 * | 8/2001 | Kroll et al. .................... | 73/146 |

* cited by examiner

Primary Examiner—Benjamin R. Fuller
Assistant Examiner—Jewel V. Thompson
(74) Attorney, Agent, or Firm—Thomas A. Jurecko

(57) ABSTRACT

An apparatus for the static testing of a vehicle tire to determine displacement as a function of force of the tire. A tire is placed upon several cross members that are vertically adjustable where the cross members are vertically adjusted to simulate a particular road bed profile. A tire is then forced down upon the cross members and the force created upon the cross members is measured against the displacement of the tire.

13 Claims, 4 Drawing Sheets

STATIC TIRE TEST FIXTURE AND RELATED METHOD

FIELD OF THE INVENTION

This invention relates generally to a static testing device for testing automobile components. More particularly, the present invention pertains to a device for testing and measuring the forces created by road imperfections on automobile tires under particular loads and a related method.

BACKGROUND

Efforts to measure the forces created by various road surfaces upon a tire tread have been addressed by several prior devices. Generally, these prior devices disclose methods of quantifying the forces placed upon the tire tread and the reaction of the tire and tread to these forces. The forces measured include the lateral displacement of the tread and spring force of the tread during use. Such conventional testing is done to evaluate the integrity of the tire under use conditions when the vehicle to which they are attached is maneuvered under normal and extreme situations. However, these prior devices evaluate only specifics of the tire and the reaction of the tire tread to particular motions.

U.S. Pat. No. 4,986,118 discloses one attempt to evaluate the force of the tire on the road bed. The device disclosed by this patent measures the force of a particular footprint of a tire on a road bed. However, the road bed disclosed is flat and the measuring is performed through needles placed in holes in the base plate of the device. Neither this nor other known devices are capable of evaluating the entire footprint of the tire for a road bed that is variable.

SUMMARY OF THE INVENTION

It is an object of the present invention to provide a device that allows for the measurement of force created by a tire during the application of a known force on the tire.

It is a further object of this invention to measure these forces for particular road bed topographies. In this way, the forces produced and experienced by the tire may be determined for road surfaces that are variable.

In one form, the present invention provides an apparatus for static testing of a vehicle tire. The apparatus includes a support structure and at least one pair of guide members vertically extending from the support structure. At least one pair of guide members includes first and second vertical guide members spaced a distance apart and disposed generally parallel to one another. At least one cross member is slidably interconnected with the first and second vertical guide members of at least one pair of guide members such that the first cross member is vertically adjustable along the first pair of guide members. A first drive member is associated with the first cross member for moving the first cross member in a vertical direction. A tire mounting member receives the tire and displaces the tire vertically relative to the first cross member.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 5b is a schematic view of a tire shown on a portion of apparatus of the present invention that represents the model road contour of FIG. 5a.

DETAILED DESCRIPTION OF THE PREFERRED EMBODIMENT

Figure 1:
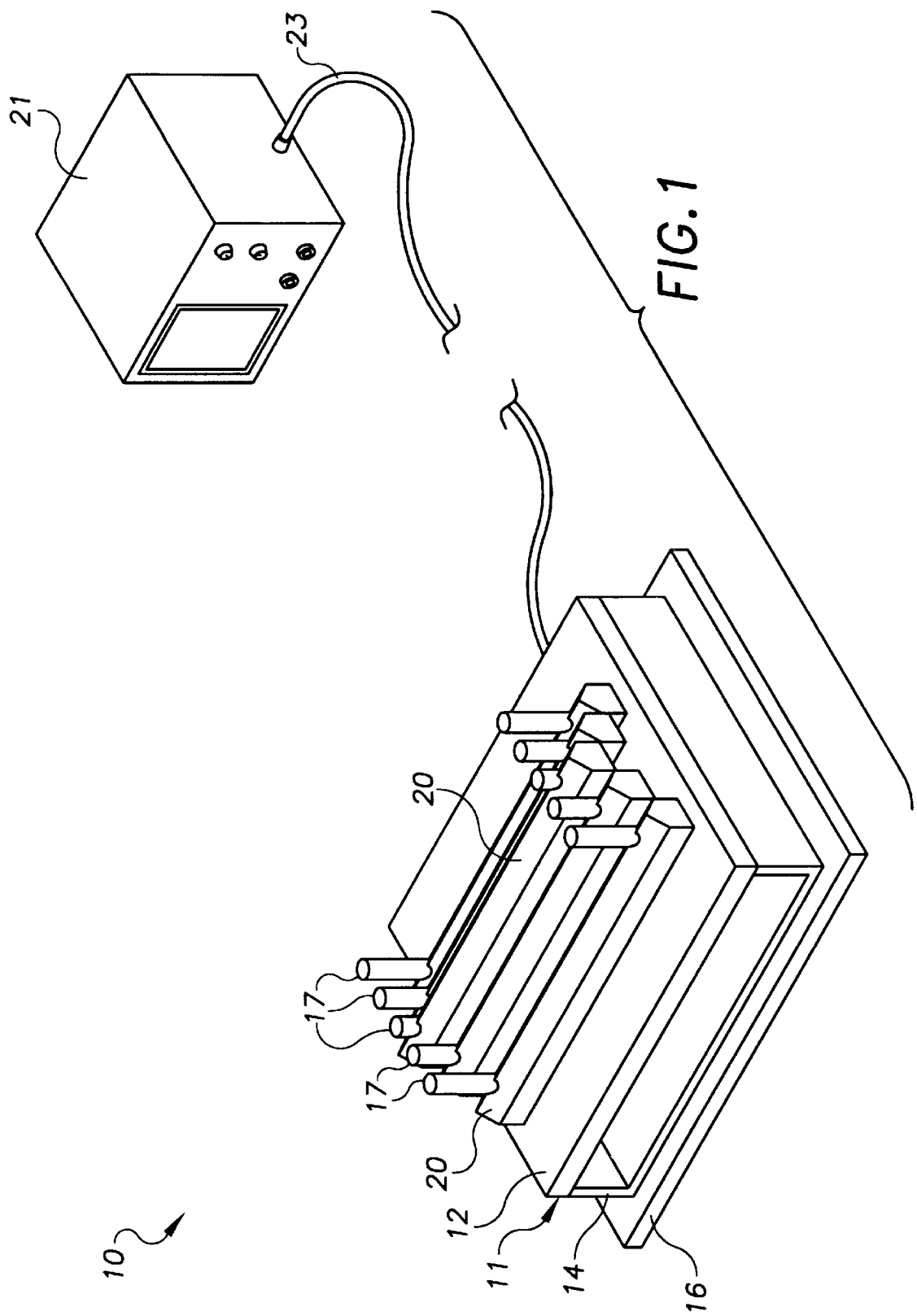
FIG. 1 is perspective view of an apparatus constructed in accordance with the teachings of a preferred embodiment of the present invention.

With reference to the drawings, a static tire testing apparatus constructed in accordance with the teachings of the preferred embodiment of the present invention is illustrated and generally identified at reference number 10. The apparatus 10 is illustrated generally to include a support structure 11 having a base plate 12 which rests upon a support member or frame 14. The support structure 11 of the testing apparatus 10 may be formed of numerous separate pieces or may be formed of one piece. In either case, the entire testing apparatus 10 must be of solid construction in order to resist the testing forces.

The support structure 11 is shown resting upon a scale 16. The scale 16 is present to measure the downward forces produced during a testing cycle (described further below). A force is transferred through the support structure 11 to the scale 16 and measured on a meter 21 attached to the scale 16 through a cable 23. The force 15 applied to scale 16, however, may be measured by several means, which are not particular to this invention, as long as an accurate measure of the force applied to the scale 16 can be known from time to time.

Upwardly extending from a top surface of the base plate 12 are a plurality of guide rods or bars 17. The guide bars 17 are arranged in spaced apart pairs and slidably pass through a corresponding pair of apertures 19 provided in a plurality of cross members 20. In a manner discussed below, the cross members 20 are vertically transposable along the associate guide bars 17. Each of the cross members 20 is shown to preferably include an upper portion having a pyramidal shape. The pyramidal shape provides a more accurate and precise representation of a road surface as further described herein.

Figure 2:
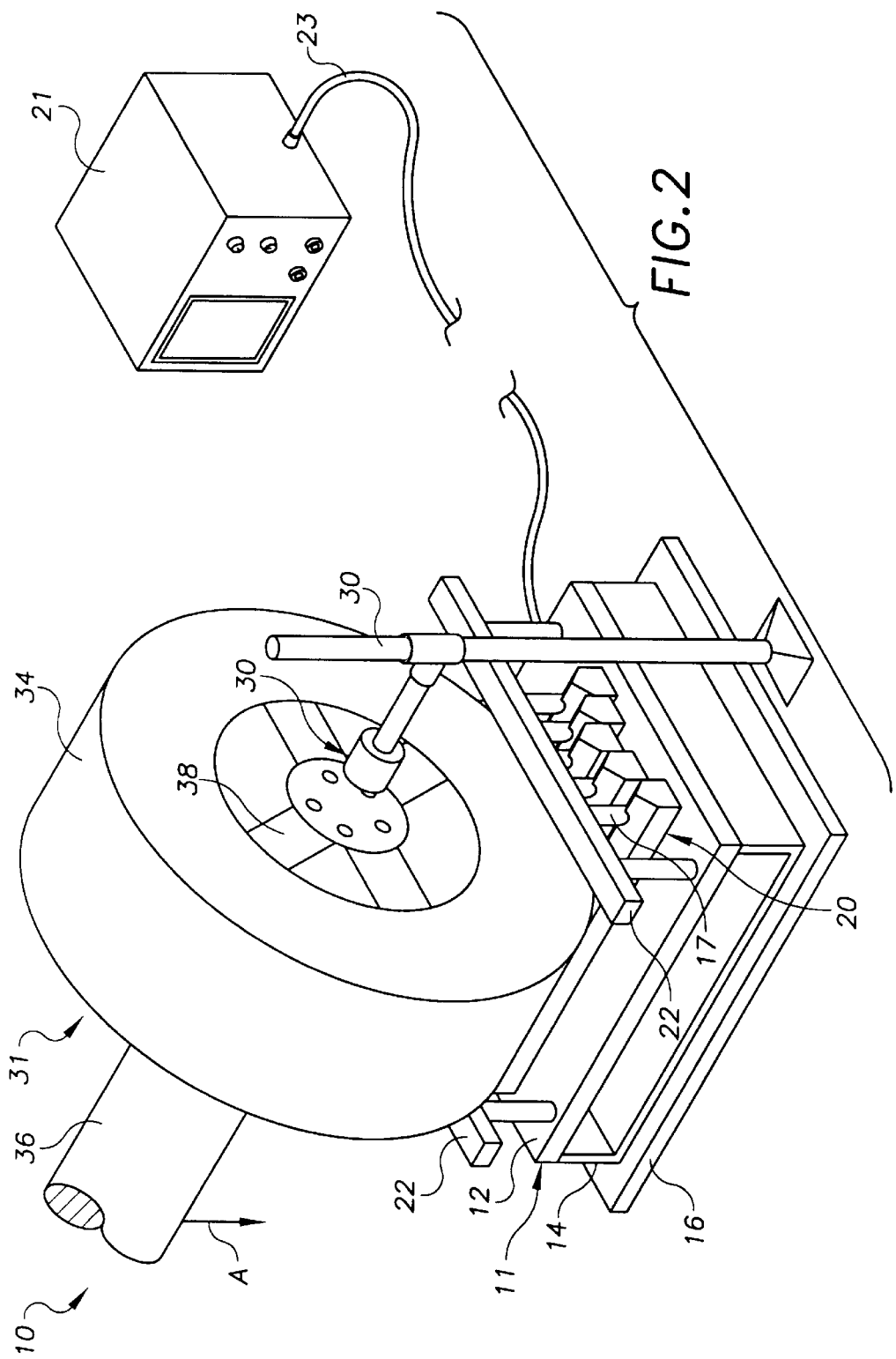
FIG. 2 is a perspective view of the apparatus of the present invention shown operatively associated with a tire and force producing member.
Figure 3:
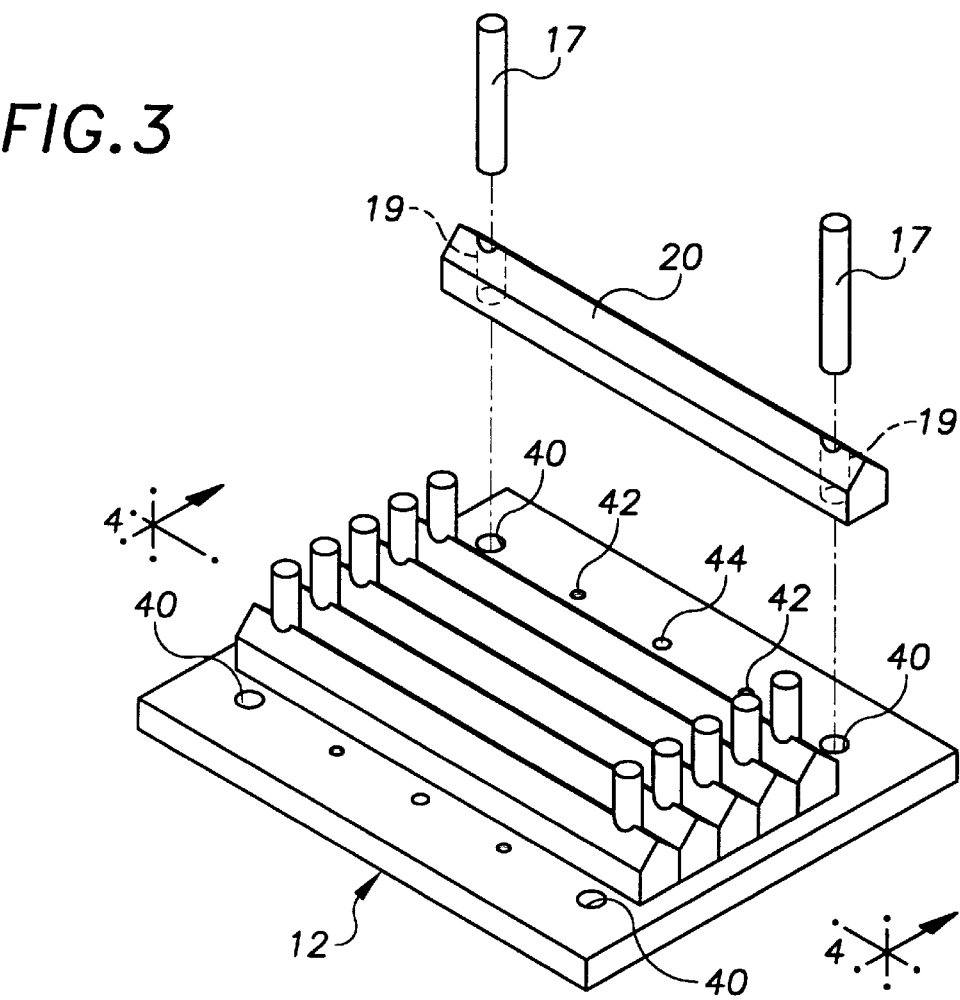
FIG. 3 is a perspective view of a portion of the apparatus of the present invention shown partially exploded.
Figure 4:
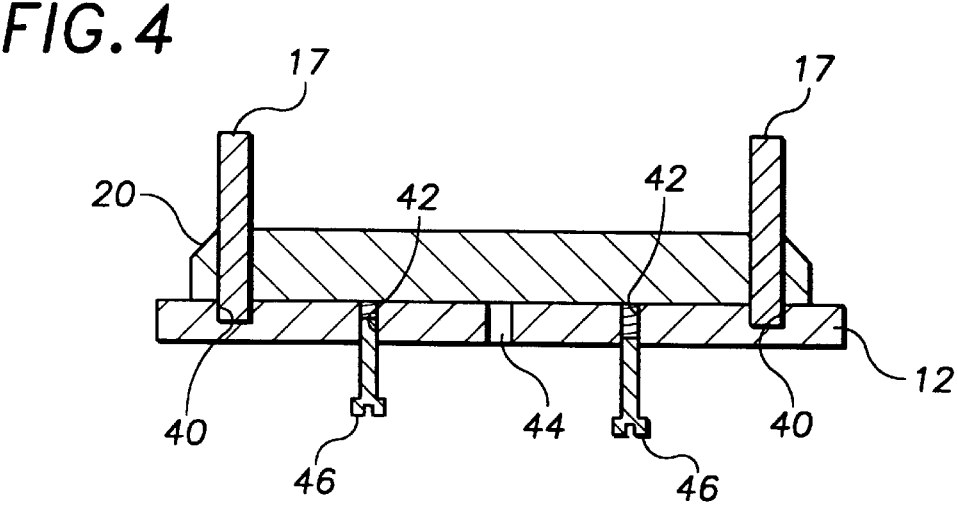
FIG. 4 is cross-sectional view taken along the line 4—4 of FIG. 3.

With particular reference to FIGS. 3 and 4, the particulars of the base plate 12 and the cross members 20 may be further seen. The base plate 12 can been seen to generally contain several rows of holes 40, 42, 44. The holes 40, 42, 44 are generally concealed by the cross members 20, however, the holes 40, 42, 44 perform critical functions. The guide bar holes 40, positioned on the outer edge of the base plate 12, receive the guide bars 17. The guide bars 17 are press fit into the guide bar holes 40 and communicate with the cross members 20 in a manner to allow only vertical adjustment. Furthermore, there are two threaded jack screw holes 42 associated with each cross members 20. The jack screw holes 42 threadably receive jack screws 46. The jack screws 46 are in communication with the cross members 20 and may be adjusted upwardly or downwardly to reposition the cross members 20. Finally, a measuring hole 44 is associated with each of the cross members 20 for accurate measuring of the displacement of the cross members 20 from the base plate 12. As can be seen from FIG. 2, once a wheel 31 is placed upon the testing apparatus 10 access to the base plate 12 is limited to approach from below.

A pair of stop bars or members 22 are illustrated which define an upper limit of travel for the cross members 20. The pair of stop bars 22 are stock portions of metal that are suitably attached, including welding or threaded attachment, to one or a plurality of the guide bars 17. The stop bars 22 ensure that the cross members 20 do not disengage the guide bars 17. Additionally, the stop bars 22 may assure that the wheel 31 does not become free of the testing apparatus 10.

The wheel 31, shown operatively associated with the testing apparatus 10, conventionally includes a tire 34 and a rim 38. The wheel 31 is affixed to a force-creating member 36 through the rim 38. The force-creating member 36 creates a downwardly directed force in the direction of Arrow A which is parallel to guide members 17 and perpendicular to the scale 16. The force Arrow A is translated to the tire 34 through the rim 38 and onto the testing apparatus 10.

The tire 31 rests upon the cross members 20 which may be independently adjusted vertically with jack screws 46 (shown in FIG. 4). The force Arrow A from the tire 34 is translated through the cross members 20 to the support structure 11 is finally measured by the scale 16. The displacement of the wheel 31 is measured by the vertical displacement measuring device 30, preferably a linear variable placement transducer. The vertical displacement measuring device 30 is shown attached to rod 32 to hold it steady throughout a cycle of the test (described further below). The vertical displacement and the force measured on the scale are measured simultaneously throughout a test cycle.

Figure 5A:
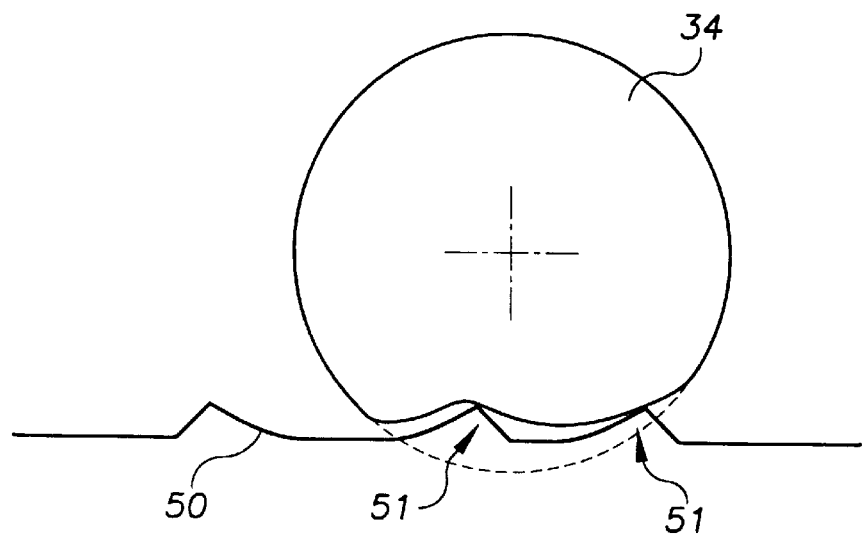
FIG. 5a is schematic view of a tire on a model road contour.
Figure 5B:
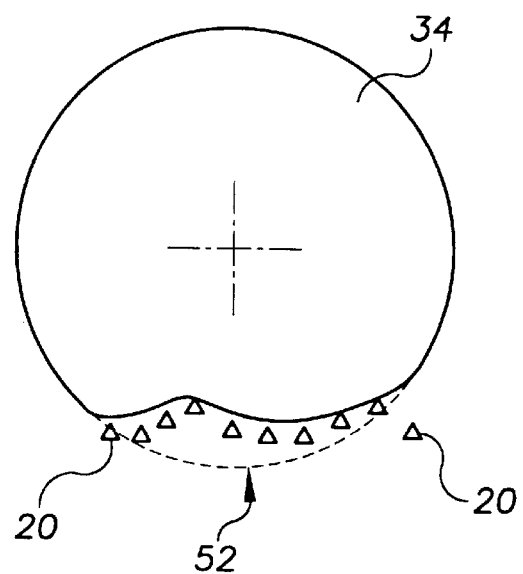

With particular reference to the schematic views of FIGS. 5a and 5b, an explanation of a test cycle will follow. A tire 34 becomes misshapen from round when it encounters a road bed 50. The area of the tire 34 that is misshapen is said to envelope the imperfections 51 of the road bed 50. It is desirous to gain knowledge as to the forces that the tire 34 encounters while enveloping the imperfections 51 of the road bed 50. To learn of the forces from road bed 50 imperfections 51 they may be transferred to the testing apparatus 10. The cross members 20 may be adjusted by the jack screws 46 to match the dimensions of the road bed 50 to create a simulated road bed. The simulated road bed 52 can create nearly the same envelope on the tire 34 as it becomes misshapen from round 57 as would the real road bed 50. When this simulated road bed 52 is created upon the testing apparatus 10 and the tire 34 is forced upon the testing apparatus 10 by the force-creating member 36 then the forces may be measured.

The scale 16 measures the force created by the tire 34 while the vertical displacement measuring device 30 measures the vertical distance that the wheel 31 has traveled. These two measurements are taken simultaneously at set intervals of time. A cycle of the test occurs when the force Arrow A has gone through the steps of (1) no force created to (2) maximum testing force and finally returned to (3) no force created. The force measured by the scale 16 and the vertical displacement measured by the vertical displacement measuring device 30 over time are then used to produce a graph of displacement versus force for evaluation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for static testing of a vehicle tire, the apparatus comprising:

a support structure including a base plate;

a plurality of guide members vertically extending from the base plate in a spaced apart relation;

a cross member slideably interconnected with a respective pair of the plurality of guide members so as to be vertically adjustable thereon;

a drive member associated with the cross member for moving the cross member in a vertical direction respective to the base plate to simulate a road bed topography;

a tire mounting member for receiving the tire and displacing the tire vertically relative to the cross member;

a force generating member coupled to said tire mounting member wherein said force generating member imparts a force on said tire; and a measuring device for measuring the force applied to the support structure from interaction of the tire with the simulated road bed topography.

2. The apparatus of claim 1, wherein the plurality of guide members includes a plurality of pairs of guide members and each pair of the plurality of pairs of guide members includes an associated cross member with an associated drive member.

3. The apparatus of claim 2, wherein the cross members cooperate to define a substantially continuous horizontal surface.

4. The apparatus of claim 3, wherein the cross members upwardly terminate at a horizontally extending line.

5. The apparatus of claim 2, wherein each of the drive members is rotatably interconnected to the base plate such that rotation of a drive member in a first direction upwardly displaces the associated cross member and rotation of a drive member in a second direction downwardly displaces the associated cross member.

6. The apparatus of claim 5, wherein each of the drive members is a jack screw threadably interconnected with the base plate.

7. The apparatus of claim 1, further comprising a measuring device for measuring vertical displacement of the tire.

8. The apparatus of claim 7, wherein the measuring device is a linear variable displacement transducer.

9. The apparatus of claim 1, wherein the measuring device is a scale disposed below the support structure.

10. A method of static testing a vehicle tire, the method comprising the steps of:

providing a support structure including a base plate;

providing a plurality of guide members vertically extending from the base plate;

providing a cross member slideably connected to an associated pair of guide members;

orienting the cross member to replicate a predetermined road profile;

downwardly displacing the tire against the cross member; and measuring a force applied to the support structure by the tire as a function of the tire displacement.

11. The method of claim 10, wherein the step of orienting the cross member includes the step of rotating the drive member associated with the cross member.

12. An apparatus for static testing of a vehicle tire, said apparatus comprising a base plate with a variable top surface wherein said variable top surface includes adjustable elements that can be positioned to simulate different road bed topographies.

13. The apparatus of claim 1, wherein the force imparted on the tire is parallel to said guide members and perpendicular to said base plate.

* * * * *